Nov. 14, 1972 L. E. RUSSELL 3,702,742
WATER PRESSURE AND LIKE SYSTEMS
Filed March 29, 1968 2 Sheets-Sheet 1

INVENTOR.
LINUS E. RUSSELL
BY Jerome P. Bloom
ATTORNEYS.

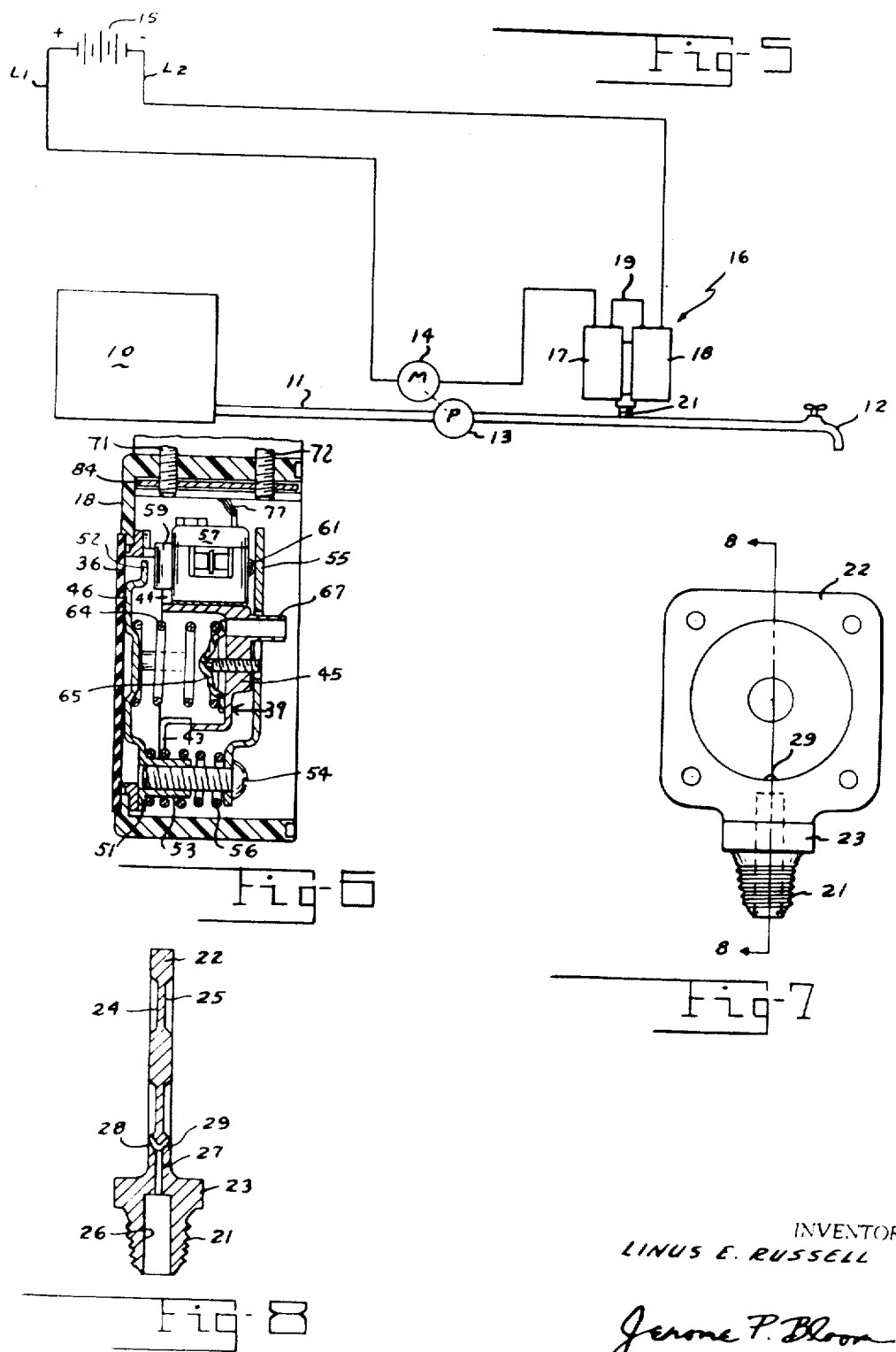

United States Patent Office 3,702,742
Patented Nov. 14, 1972

3,702,742
WATER PRESSURE AND LIKE SYSTEMS
Linus E. Russell, Springfield, Ohio, assignor to International Telephone and Telegraph Corporation, New York, N.Y.
Filed Mar. 29, 1968, Ser. No. 717,342
Int. Cl. F04b 49/00
U.S. Cl. 417—25                                    2 Claims

ABSTRACT OF THE DISCLOSURE

A water pressure or like system for supplying fluid from a selected source to a place of use characterized in preferred embodiments by pressure sensing means selectively responding to predetermined high and low pressure conditions in the flowing fluid to selectively cause an interruption of the flow or to energize the flow, there being further sensing means to deenergize the system when the source of fluid reaches a diminished level of supply.

---

This invention relates to water pressure and like systems as used, for example, in the self-contained water supply systems of boats and house trailers. It is particularly concerned with constant pressure systems, obviating the use of pressurized storage tanks, and with pressure responsive pump control devices therein.

The object of the invention is to simplify the construction as well as the means and mode of operation of pressure responsive switches, whereby such switches may not only be economically manufactured, but will be more efficient and satisfactory in use, adaptable to a wide variety of application, and be unlikely to get out of order.

A further object of the invention is to introduce an automatically acting "dry tank" control which will shut off the pump at a predetermined low pressure level irrespective of signals issuing from other system controls.

Another object of the invention is to present switch control apparatus combining in a single unit a high-low pressure responsive switch, starting and stopping a pump at different pressure levels, and a switch incorporating an overriding dry tank control as described.

A further object of the invention is to present a pressure switch characterized by a high degree of simplicity and compactness in its construction and by ease of adjustment for both high and low pressure levels.

Still another object of the invention is to provide a water or like system presenting features of constant pressure and automatic control as described.

A further object of the invention is to provide a pressure responsive switch assembly possessing the advantageous structural features, the inherent meritorious characteristics and the mode of operation herein mentioned.

With the above and other incidental objects in view as will more fully appear in the specification, the invention intended to be protected by Letters Patent consists of the features of construction, the parts and combinations thereof, and the mode of operation as hereinafter described or illustrated in the accompanying drawings, or their equivalents.

Referring to the accompanying drawing wherein is shown one but obviously not necessarily the only form of embodiment of the invention, FIG. 1 is a view of a switch unit in accordance with the illustrated form of the invention, showing the combined pressure and dry tank switches;

FIG. 5 is a diagram of water supply system of the kind to which the instant invention relates;

FIG. 6 is a fragmentary, detailed view in longitudinal section of one switch device being taken substantially along the line 6—6 of FIG. 2;

FIG. 7 is a front view of a mounting plate common to the devices of the switch unit; and FIG. 8 is a view in section of the mounting plate of FIG. 7, being taken substantially along the line 8—8 of FIG. 7.

Like parts are indicated by similar characters of reference throughout the several views.

Figure 1:
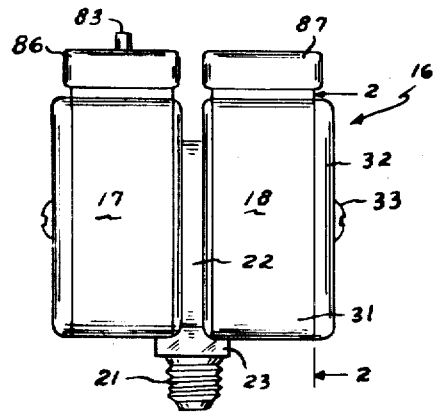

Referring to FIG. 5 of the drawings, a water system to which the instant invention relates may comprise an unpressurized storage tank 10. Extending from the tank 10 is a supply line 11 leading to one or more places of use, here diagramatically represented as a faucet 12. In the supply line 11 is a pump 13 arranged in driven relation to an electric motor 14. The latter is included in an electrical circuit deriving its power from a suitable source, as a battery 15.

Electrical conductors L1 and L2 extend from the battery 15 to the motor 14 and the closing of the circuit across these conductors serves to energize the motor and place the pump 13 in operation. Adapted to open and close the described circuit, and thereby to start and to stop operation of the pump 13, is a switch unit 16 comprised of individual switch devices 17 and 18 connected in series relation in the conductor L2, the two switch devices being series connected, in an electrical sense, by bridging connector 19. The switch unit 16 is pressure responsive in nature, being installed through a fitting 21 in the water supply line 11 at a location intermediate the pump 13 and the faucet 12. Under differing pressure conditions the switch devices 17 and 18 individually respond by opening and closing the circuit to conductor L2. Since the devices are in a series relation the opening of either switch device effectively deenergizes the motor 14 and stops operation of pump 13.

With the pump 13 in operation water under pressure is supplied to the faucet 12. If the faucet is open, water flows continuously through the system, being drawn from tank 10 and directed under pressure by the pump 13 to the place of use as represented by the faucet 12. Closing of the faucet results in an immediate increase in pressure in the supply line 11 at the location of switch unit 16. At a predetermined high pressure value, switch device 18 opens, deenergizing motor 14 and stopping pump 13. The system remains inactive until water is again desired. Opening of the faucet 12 effects an immediate drop in pressure in supply line 11 at the location of switch unit 16. At a predetermined low pressure value the switch device 18 recloses whereupon motor 14 is again energized and pump 13 restarted. The supply of water under pressure to the faucet 12 is instantaneous and it will be understood that the system provides for water flow at a substantially constant pressure irrespective of the level of water in the tank 10.

The switch device 17 has a "dry tank" or low water level sensing function. It is normally closed but responds to a predetermined low pressure value to open and thereby shut off the pump 13 irrespective of the condition of switch device 18. Thus the switch device 18 may be considered the normally operating pressure switch by which the pump 13 is started and stopped as the demand for and disuse of water pressure is signalled by opening and closing of the faucet 12. Switch device 17, on the other hand, serves an automatic, overriding control function, shutting down the system when the pump 13 has drawn off the available water supply.

Considering now the switch unit 16, the devices 17 and 18 thereof have a common mounting upon a plate 22 of which the fitting 21 is an integral part. The plate 22 has a generally flat, square-like configuration, with the fitting 21 projecting from one side edge thereof. At the base of the fitting 21, where it joins the body proper of the plate 22, there is formed a flange 23 projecting to either side of the plate 22 and providing on respective sides thereof seats for the devices 17 and 18. In opposite faces of the plate 22 are respective annular recesses 24 and 25. Within the mounting plate is an open bore 26 in fitting 21. This bore is connected by a passage 27 to the recesses 24 and 25, the latter connection being afforded by individual respective small diameter openings 28 and 29. The fitting 21 being installed in a pressure fluid supply line, as heretofore seen, the value of such fluid pressure is continuously communicated through the bore 26, passage 27 and openings 28 and 29 to the recesses 24 and 25. The switch devices 17 and 18 are seated on the flange 23 in a manner to cover or to close the respective recesses 24 and 25. Hence the sensed fluid pressure is communicated likewise to the devices 17 and 18.

The devices 17 and 18 are identical except for differences to be hereinafter mentioned so that a description of one will in the main serve for both. Accordingly, and considering pressure switch 18, this device is contained in a generally rectangular protective case 31. At what may be considered its outer end the case is open although normally closed by a removable cover member 32 held in place by a screw 33. The opposite end of the case, or that side in a facing relation to mounting plate 22, is closed but has a circular opening 34 therein surrounded by a square-like recess 35. Seated in the recess 35 is a diaphragm 36 covering opening 34.

Figure 4:
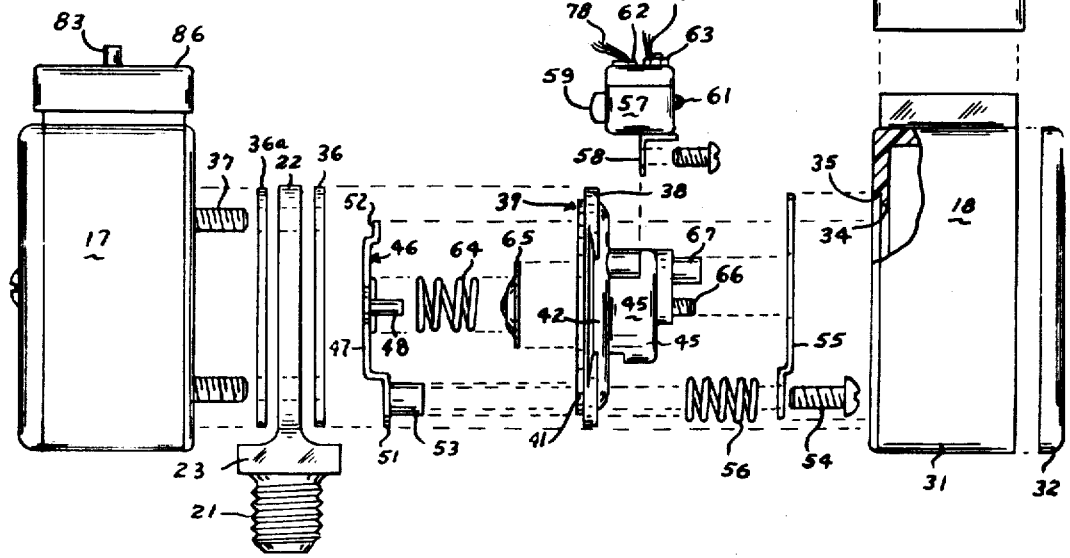
FIG. 4 is an exploded view in side elevation, showing the parts of one of the pressure responsive switch devices of the switch unit.

The case 31 is held to the mounting plate 22 by screw bolts 37 which extend through aligned openings in the plate 22, diaphragm 36 and in the recessed area 35 of the case. Within the case 31 the bolts 37 are received in and anchored to corner ears 38 on a body member 39. The bolts 37 are common to the switch devices 17 and 18, their heads being received in the device 17 and the outer extremities projecting into case 18 as described and having a screw threaded engagement in complementary threaded openings in the described ears 38. In the exploded view of FIG. 4 the bolts 37 are shown passing through a diaphragm 36a in advance of mounting plate 22, the element 36a corresponding to the element 36 and being a part of the device 17.

The bolts 37 draw the body member 39 to a seat on the closed side of case 31, a projected lip 41 being received in the opening 34 and aligning the body member with such opening. A central portion 42 of the body member 39 is recessed and has diametrically opposed slots 43 and 44 therein. Centrally of the portion 42 is a further recessed cup-shaped portion 45. The slots 43 and 44 open partly into such cup-shaped portion.

The interior of body member 39 as defined by recessed portion 42 provides a floating mounting for an actuating member 46. The member 46 comprises a flat disc-shaped portion 47, on diametrically opposite peripheral points of which are upstanding studs 48. These are slidably received in openings 49 in the recessed portion 42 of body member 39. My virtue of the described mounting the actuating member 46 is held generally aligned with body member 39 while being capable of relative longitudinal movement. Also the studs 48 are loosely received in the openings 49, allowing actuating member 46 limited relative tilting motion as well. The studs 48 being received in openings 49 restrain the actuating member 46 from appreciable angular motion in a rotary sense.

At other diametrically opposed points on the periphery of the actuating disc 47 are projecting tabs 51 and 52, these being offset out of the plane of disc portion 47. Secured to the tab 51 to project perpendicularly therefrom toward the open end of the case 31 is an internally threaded sleeve 53. A screw 54 has its shank end threadedly received in the sleeve 53. The screw 54 projects upwardly along side the cup shaped portion 45 of the body member 39 and passes freely through one end of an arm 55. A compression spring 56 is seated on the tab 51 and extends in surrounding relation to sleeve 53 and screw 54 in a manner to hold the said one end of the arm 55 firmly against the head of screw 54. The arm 55 is relatively long and it projects in a transverse overlying relation to the body member 39 in a manner to position its opposite or outer end in an aligned spaced relation to the tab 52. Together the outer end of arm 55 and the tab 52 occupy an embracing relation to a micro-switch unit 57 stationarily mounted through a bracket 58 to the body member 39. The micro-switch unit 57 is of a generally conventional kind in which a movable contact member makes alternative engagement with opposing stationary contacts under the urging of oppositely acting plungers 59 and 61. In the present, illustrated instance depression of the plunger 59 sets the movable contact member to open a circuit between terminals 62 and 63, with the circuit remaining open irrespective of subsequent release of plunger 59 until the plunger 61 is depressed positively to effect such reclosing movement of the movable contact. The plunger 59 is aligned with and normally substantially engages the tab 52 on actuating member 46, the tab reaching cooperative engagement with the plunger through the slot 44 in the body member 39. The outer end of arm 55 overlies and is adapted to depress switch plunger 61.

The actuating member 46 is urged toward the closed end of the case 31 by a compression spring 64 interposed between the disc portion 47 of such member and a spring retainer 65 seated in the bottom of the cup shaped portion 45 of the body member 39. Under the urging of the spring 64 the actuating member 46, through its disc portion 47 bears on the diaphragm 36, the outward travel of the member being limited by such engagement and by interengagement of a projecting portion of the tab 51 with a web of body member 39 beyond opening or slot 43. The diaphragm 36 is in a covering relation to the annular recess 25 in the mounting plate 22, which recess, as noted, serves as a pressure chamber reflecting the value of the fluid pressure in supply line 11. According to the construction and arrangement of parts, therefore, the actuating member 46 takes up a longitudinal position of adjustment as determined by the opposing forces represented by the fluid pressure in recess 25 and the pressure of spring 64. As will be understood, at some predetermined high fluid pressure value the fluid pressure exerted upon the member 46 in opposition to spring 64 will be sufficiently great to move the actuating member a distance enabling it to depress plunger 59 and open switch 57 as described. A drop in fluid pressure permits a return motion of the actuating member 46 and consequent release of plunger 59. However, the pressure value at which switch 57 is caused to reclose is preselected by the bodily positioning of arm 55 operable upon plunger 61. Thus, at an earlier or later point in the return or retracting motion of the actuating member 46 the arm 55 engages and depresses plunger 61 whereupon switch 57 is reclosed. Fine adjustments in the position of the arm 55 relative to the plunger 61 are achieved by a turning in or backing off of the screw 54. The spring 56 causes the arm 55 to follow such longitudinal adjusting motions of the screw 54 and applies a force tending to resist change in the position of the screw as might result from vibration. Adjustments in the intensity of the spring 64 are possible through a set screw 66 which is mounted in the body 39 with an inner end projecting into the center of spring retainer 65. Both the outer end of set screw 66 and screw 54 are conveniently presented to be accessible through the open end of the case 31. The body member 39 also mounts in adjacent relation to the set screw 66 an internally threaded sleeve 67 which receives the inner end of screw 33 holding cover 32 in place. Overtravel of the member 46, beyond that necessary to depress plunger 59 is accommodated in the spring 64 and in a tilting motion of such member.

In accordance with the hitherto described mode of operation of the pressure switch 18 a shutting off of the faucet 12 causes the pressure beyond pump 13 to rise sufficiently to move actuating member 46 a distance to depress plunger 59 and open switch 57. This stops the pump 13. The pressure beyond pump 13 remains relatively elevated although some retraction of the actuating member 46 is possible without a reclosing of the switch 57. When the faucet 12 is again turned on, however, there is a sharp drop in pressure in the line 11 resulting in a further return or retraction of member 46 a distance sufficient to enable arm 55 to depress plunger 61. This recloses the switch 57 and restarts the pump 13. The system will continue in operation in this manner with the pump 13 shutting off at some predetermined high selected level and with the pump turning on again at some predetermined low selected level.

The low water cut off or "dry tank" switch 17 is under normal conditions inactive. The switch unit therein corresponding to the present switch 57 occupies a normally closed position by virtue of the actuating member therein corresponding to the actuating member 46 holding depressed the switch plunger corresponding to plunger 59. So that this plunger will remain so depressed, at fluid pressures as low as or somewhat lower than the pressure at which the switch 18 restarts the pump 13, the spring in the switch 17 corresponding to the spring 64 is made relatively weaker. Thus, this relatively weaker spring will be unable to return or to retract the actuating member operated thereby until some selected very low fluid pressure is sensed indicating an exhaustion of the water supply. It will be understood that as between the switch devices 17 and 18 the switch units therein are reversed in their operation. Thus whereas the switch 57 of the device 18 is opened upon depression of the plunger 59, in the case of switch 17 the corresponding switch unit is closed by depression of the plunger corresponding to switch 59 and is opened by depression of the plunger corresponding to plunger 61.

Figure 2:
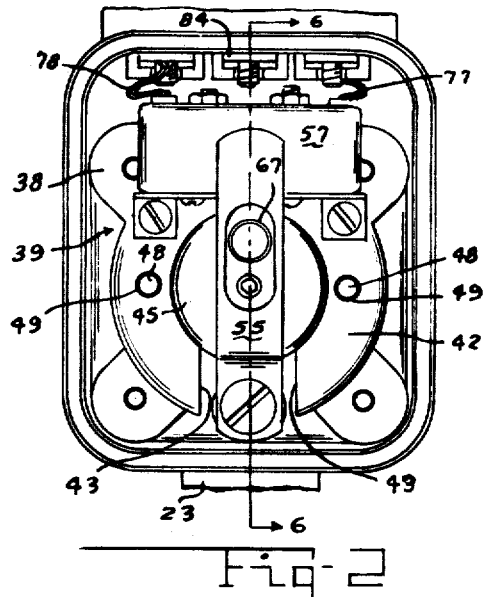
FIG. 2 is a front view of the unit of FIG. 1, a cover plate of one of the switch devices being removed, the view being taken substantially along the line 2—2 of FIG. 1.
Figure 3:
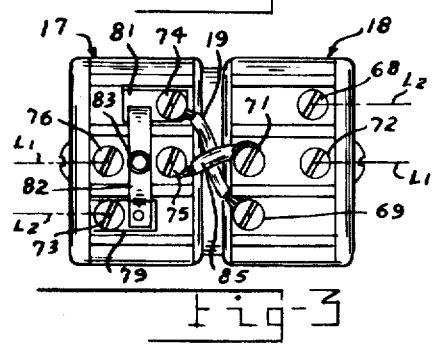
FIG. 3 is a top view of the unit of FIG. 1, cover members being removed to show electrical connections and junctions.

An operation of the dry tank switch 17 leaves the system open and unable to operate even though faucet 12 be turned on in a demand for water after the tank 10 has been refilled. Accordingly a manual reset means is provided whereby the pump 13 may be started to generate pressure in the system and so actuate the member in switch 17 corresponding to actuating member 46 to reclose the circuit therethrough. In this regard, there is mounted on the switch 18 terminal posts 68, 69, 71 and 72. Like terminal posts 73-76 are mounted in the top of switch device 17. The posts 68 and 69 are interconnected through the switch unit 57, as through the wires 77 and 78 (FIG. 2). The terminal posts 73 and 74 are similarly interconnected with one another through the switch unit therein corresponding to switch 57. The switch units are in a series relation to one another, as before seen, through a connecting wire 19 extending from post 74 to post 69. In the case of switch device 17, however, the post 73 and the post 74 have extended contact plates 79 and 81 respectively. A spring contact arm 82 is made fast at its one end to plate 79 and extends at its other end into overlying relation to the plate 81, the arm being bent normally to clear or to remain out of contact with the plate 81. A button 83 of non-conductive material is mounted on the contact arm 82 intermediate its ends. By pressing on the bottom 83 the arm may be made to contact plate 81. When it does so a bridging connection is established between the terminal posts 73 and 74 in by-passing relation to the switch unit in the device 17. Accordingly, and assuming the switch unit in pressure switch 18 also to be closed, a circuit is thereby closed through the motor 14, and the pump 13 started. Pressure is supplied instantaneously to the device 17 and the switch unit therein closed by the application of such pressure. The automatic control as represented by the switch device 17 accordingly is reestablished and the bridging arm 82 may be released.

The terminal posts 71–72 and 75–76 represent a means by which the conductor L1 may be led to the motor through the switch unit 16. A practical embodiment of the invention will find both leads L1 and L2 reaching the motor through the unit 16. The terminal posts 71 and 72 are permanently interconnected by an electrically conductive plate 84 inside the case 31 while the terminal posts 75 and 76 are similarly connected by a like plate. A connecting wire 85 joins the sets of posts 71–72 and 75–76 in series relation.

The tops of the switch devices 17 and 18 occupied by the several described terminal posts and connecting wires are closed by respective caps 86 and 87 of non-conductive material, the former having an opening for passage of the button 83 therethrough.

From the above description it will be apparent that there is thus provided a device of the character described possessing the particular feature of advantage before numerated as desirable, but which obviously is susceptible of modification in its form, proportions, detail construction and arrangement of parts without departing from the principle involved or sacrificing any of its advantages.

While in order to comply with the statute the invention has been described in language more or less specific as to structural features, it is to be understood that the invention is not limited to the specific features shown, but that the means and construction herein disclosed comprise but one of several modes of putting the invention into effect, and the invention is therefore claimed in any of its forms or modifications within the legitimate and valid scope of the appended claims.

Having thus described my invention, I claim:

1. In a boat or other device of mobile characteristics, a self-contained water storage and distribution system including an unpressurized storage tank pre-filled with a quantity of water expended in the use of the water system, distribution means including a flow line connected at one end with said tank and discharging directly at its opposite end in a place of use, a pump operable to draw water from said tank and effect a pressured flow thereof through said flow line to said place of use, a valve at said place of use having open and closed positions whereby the water supply may selectively be drawn upon, said pump when in operation pressurizing said flow line in advance of said valve, the pressure therein dropping when said valve is opened and rising when said valve is closed, means sensing the pressure in said flow line between said pump and said valve and responding to opening of said valve to start said pump and to closing of said valve to stop said pump, and other means sensing the pressure in said flow line between said pump and said valve and responding to an absence of pressure therein indicating a relatively dry storage tank by stopping said pump irrespective of the position of said valve and of the operational condition of the first said sensing means characterized in that said pressure sensing means are mounted to a common support, said support having a single connection to said flow line and transmitting pressure simultaneously to the separate said pressure sensing means.

2. In a water pressure or like system for supplying fluid from a selected source directly to a place of use without intermediate pressure storage, said source being an unpressurized storage place holding an expendable supply of fluid, means to transmit the fluid from said source and deliver it to said place of use, discharge control means at a terminus of said transmitting and delivering means for selectively blocking the delivery of said fluid to said place of use, pump means intermediate said source and said blocking means operable to draw fluid from said storage place and generate a pressured flow thereof to said blocking means, plural control means for said pump means including first and second relatively independent sensing means in common communication with fluid in said transmitting and delivering means at a location in following relation to said pump means, a first said sensing means having means in connection therewith conditioning it to respond to a fall in pressure in said transmitting and delivering means occasioned by opening of said discharge control means to selectively operate a portion of said pump control means to start the pump and to respond to a rise in pressure in said transmitting and delivering means occasioned by closing of said discharge control means to selectively operate a portion of said pump control means to stop the pump, and the second said sensing means having in connection therewith means conditioning the same to respond to a substantial absence of pressure in said transmitting and delivering means as occasioned by the pumping dry of said storage place to operate another portion of said control means to stop the pump if operating or to prevent its operation if not operating; an electrically energizable motor operating said pump and being in a motor energizing circuit further including series arranged switches respectively operable by said pressure responsive means, the pressure responsive means in said first sensing means utilizing rising pressure in said transmitting and delivering means to open a respective switch and utilizing a lowering pressure to close its said respective switch and the pressure responsive means in said second sensing means utilizing a rising pressure in said transmitting and delivering means to close a respective switch and utilizing a lowering pressure to open its said respective switch, the pressure responsive means in said second sensing means responding relatively weakly to lowering pressure to open its said respective switch at a pressure value lower than that at which the pressure responsive means in said second sensing means moves to close its said respective switch; said first and second sensing means comprising substantially identical combinations of pressure responsive means and switches operable thereby, each said combination further including a spring opposing movement of said pressure responsive means responsive to rising pressure in said transmitting and delivering means, the spring in said second sensing means being relatively weaker than the spring in said first sensing means.

References Cited
UNITED STATES PATENTS

| | | | |
|---|---|---|---|
| 2,122,700 | 7/1938 | Schaefer | 200—81.4 |
| 2,923,790 | 2/1960 | Ernst | 200—81.4 |
| 1,952,265 | 3/1934 | Leland | 103—25 X |
| 2,440,981 | 5/1948 | Smith | 103—25 X |
| 2,741,987 | 4/1956 | Murphy | 103—25 |
| 2,765,743 | 10/1956 | Hollinshead | 103—25 |
| 2,910,005 | 10/1959 | Kaatz | 103—25 |
| 2,981,195 | 4/1961 | Payne II et al. | 103—25 |
| 1,784,205 | 12/1930 | Seeger | 103—25 |
| 3,376,821 | 4/1968 | East | 103—25 |
| 3,302,574 | 2/1967 | Mitchell | 103—25 |

WILLIAM L. FREEH, Primary Examiner